United States Patent [19]
Franyutti et al.

[11] Patent Number: 5,166,183

[45] Date of Patent: Nov. 24, 1992

[54] WATER-BLOWN INTEGRAL SKIN POLYURETHANE FOAMS

[75] Inventors: Sergio Franyutti, Pittsburgh, Pa.; Klaus Brecht, Burscheid, Fed. Rep. of Germany

[73] Assignees: Miles Inc., Pittsburgh, Pa.; Bayer AG, Leverkusen, Fed. Rep. of Germany

[21] Appl. No.: 686,078

[22] Filed: Apr. 16, 1991

[51] Int. Cl.$^5$ ............... C08J 9/34; B29C 65/00
[52] U.S. Cl. ..................... 521/51; 264/45.5; 521/170; 521/174; 521/176
[58] Field of Search ............... 521/51, 170, 174, 176; 264/45.5

[56] References Cited

U.S. PATENT DOCUMENTS

| | | | |
|---|---|---|---|
| 3,523,918 | 8/1970 | Gonzalez | 260/2.5 |
| 3,726,952 | 4/1973 | Boden et al. | 264/48 |
| 3,836,487 | 9/1974 | Carter, Jr. | 260/2.5 AK |
| 3,925,527 | 12/1975 | Kleimann et al. | 264/53 |
| 4,020,001 | 4/1977 | White | 252/182 |
| 4,024,090 | 5/1977 | von Bonin et al. | 260/2.5 AH |
| 4,065,410 | 12/1977 | Schäfer et al. | 260/2.5 AM |
| 4,448,903 | 5/1984 | Liang et al. | 521/137 |
| 4,477,602 | 10/1984 | Liang et al. | 521/137 |
| 4,986,926 | 1/1991 | Hoffman | 252/102 |

*Primary Examiner*—Morton Foelak
*Attorney, Agent, or Firm*—Joseph C. Gil

[57] ABSTRACT

The present invention is directed to an integral skin foam prepared by reacting a specific isocyanate, a specific isocyanate reactive component and water as the only blowing agent.

6 Claims, No Drawings

WATER-BLOWN INTEGRAL SKIN POLYURETHANE FOAMS

BACKGROUND OF THE INVENTION

Integral skin polyurethane foams are well known in the art. See, e.g., U.S. Pat. Nos. 3,523,918, 3,726,952, 3,836,487, 3,925,527, 4,020,001, 4,024,090, and 4,065,410. In general, such foams are prepared by reacting isocyanates with polyols in the presence of an organic blowing agent. Although the use of water as the only blowing agent to produce an integral skin polyurethane foam has been suggested (see, e.g., the above noted U.S. Patents), in all commercial applications of which Applicants are aware, the blowing agent is a chlorofluorocarbon such as monofluorotrichloromethane.

An isocyanate having an isocyanate group content of about 19% by weight and prepared by reacting (i) methylenebis(phenyl isocyanate), (ii) a carbodiimide group modified methylenebis(phenyl isocyanate) having an isocyanate group content of about 29% by weight and (iii) a 2000 molecular weight polyester diol is commercially available. In addition, blends of such isocyanates with urethane group containing isocyanates are also known (see, e.g., U.S. Pat. No. 4,986,929).

Systems are commercially available which are used in the production of polyurethane shoe soles. In general, these systems comprise a polyether diol, a polyether triol, a chain extender (such as 1,4-butane diol or ethylene glycol), an organic blowing agent, catalyst and surfactant. The use of so-called filled polyols in such systems is described in U.S. Pat. Nos. 4,448,903 and 4,477,602.

DESCRIPTION OF THE INVENTION

The present invention is directed to an improved process for the preparation of an integral skin foam by reacting an organic isocyanate with an active hydrogen group containing material in the presence of a catalyst and a blowing agent in a closed mold. The improvement resides in the following:

A) the organic isocyanate is an isocyanate having an isocyanate group content of from about 16 to about 25% by weight and consists of
  i) from 10 to 100 parts by weight of an isocyanate having an isocyanate group content of from about 16 to about 22% by weight and being prepared by reacting:
   1) from about 40 to about 60 parts by weight of methylenebis(phenyl isocyanate),
   2) from 0 to 10 parts by weight of a carbodiimide group modified methylenebis(phenyl isocyanate) having an isocyanate group content of from about 24 to about 33% by weight, and
   3) from about 30 to about 50 parts by weight of a polyester diol having a molecular weight of from about 1000 to about 3000, with the amounts of 1), 2), and 3) totaling 100 parts by weight; and
  ii) from 0 to 90 parts by weight of a modified isocyanate having an isocyanate group content of from about 18 to about 25% by weight and being prepared by reacting 1 mole of methylene-bis(phenyl isocyanate) with from about 0.1 to 0.3 moles of a 134 to 700 molecular weight poly-1,2-propylene ether glycol;

B) the active hydrogen group containing material consists essentially of:
  1) from about 10 to about 90 parts by weight of a polyether diol having an OH number of from about 20 to about 40, having an ethylene oxide content of from about 20 to about 40% by weight, and with from about 90 to about 100% of its hydroxyl groups being primary OH groups,
  2) from about 10 to about 90 parts by weight of a polyether polyol having an OH number of from about 20 to about 40, and an average OH functionality of from 2.5 to 3;
  3) from about 5 to about 15 parts by weight of 1,4-butane diol; and
  4) from about 0.5 to about 10 parts by weight of ethylene glycol, with the amounts of 1), 2), 3), and 4) totaling 100 parts by weight; and C) the blowing agent consists solely of water.

It has been found that integral skin foams based upon the above noted formulation have improved low temperature flex life and abrasion resistance properties, while substantially maintaining the excellent physical properties normally associated with such systems.

As used herein, the term, methylenebis(phenyl isocyanate), is intended to include the 2,2'-isomer, the 2,4'-isomer, the 4,4'-isomer, and mixtures thereof.

As noted earlier, the isocyanate component of the invention is known, and is described in U.S. Pat. No. 4,986,929, the disclosure of which is herein incorporated by reference.

The isocyanate component A) i) of the present invention is an isocyanate having an isocyanate group content of from about 16 to about 22% by weight, and preferably from about 18 to about 20% by weight, prepared by reacting:

(i) from about 40 to about 60, and preferably from about 50 to about 60 parts by weight of methylenebis(phenyl isocyanate), (ii) from 0 to about 10, and preferably from about 4 to about 8 parts by weight of a carbodiimide group modified methylenebis(phenyl isocyanate) having an isocyanate group content of from about 24 to about 33, and preferably from about 28 to about 31% by weight, and (iii) from about 30 to about 50, and preferably from about 35 to about 41 parts by weight of a polyester diol having a molecular weight of from about 1000 to about 3000, and preferably from about 1500 to about 2500, with the amounts of (i), (ii) and (iii) totalling 100 parts by weight.

The carbodiimide group modified methylenebis(phenyl isocyanates) used to prepare the isocyanate are known in the art. The preparation of such carbodiimide modified isocyanates is described in U.S. Pat. Nos. 3,384,653 and 4,154,752, the disclosures of which are herein incorporated by reference.

The polyesters useful in preparing the isocyanate are also generally known in the polyurethane art. Typically, such polyesters are reaction products of dihydric alcohols and dibasic carboxylic acids. Instead of the free acid, the corresponding anhydride may be used. The acids may be aliphatic, cycloaliphatic, aromatic or heterocyclic. Useful acids include succinic acid, adipic acid, suberic acid, azelaic acid, sebacic acid, phthalic acid, isophthalic acid and the like. Useful dihydric alcohols include ethylene glycol, 1,2- and 1,3-propylene glycol, 1,4- and 2,3-butane diol, 1,6-hexane diol, 1,8- octane diol, neopentyl glycol, cyclohexanedimethanol and the like.

The most preferred isocyanate A) i) is an isocyanate having an isocyanate group content of about 19% by weight prepared by reacting:
  (i) 56 parts by weight of the 4,4'-isomer of methylenebis(phenyl isocyanate),
  (ii) 6 parts by weight of a carbodiimide modified methylenebis(phenyl isocyanate) having an isocyanate group content of 29.3% and a viscosity at 25° C. of less than 100 mPa.s (and commercially available from Mobay Corporation as Mondur CD), and
  (iii) 38 parts by weight of a 2000 molecular weight polyester diol prepared by reacting adipic acid, 1,4-butane diol and ethylene glycol (ethylene glycol to butane diol molar ratio of about 1:1). This preferred isocyanate component is commercially available from Mobay Corporation as Mondur E-501.

The isocyanate component A) ii) is also known in the art and is described in U.S. Pat. No. 3,644,457, the disclosure of which is herein incorporated by reference. The most preferred modified isocyanate has an isocyanate content of about 23% by weight and is prepared by reacting 4,4'-methylenebis(phenyl isocyanate) and tripropylene glycol, and is commercially available as Mondur PF from Mobay Corporation.

The active hydrogen group containing component of the present invention consists essentially of a blend of several different components. The first component is a polyether diol having an OH number of from about 20 to about 40 (preferably from about 25 to about 35), having an ethylene oxide content of from about 20 to about 40% by weight (preferably from about 30 to about 40% by weight), and with from about 90 to about 100% of its hydroxyl groups being primary OH groups (and preferably from about 95 to about 100% primary OH groups).

Also necessary for preparing the integral skins foams herein are polyether polyols having OH numbers of from about 20 to about 40 (preferably from about 25 to about 35), and having average OH functionalities of from 2.5 to 3. These polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols and triols, water, aniline, ammonia, and ethanolamine. It is preferred to use polyethers which contain substantial amounts of primary hydroxyl groups in terminal positions (up to 90% by weight, based on all of the terminal hydroxyl groups present in the polyether).

"Filled" polyethers, such as those modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups. In addition, filled polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols. Typical of useful filled polyethers are described in U.S. Pat. Nos. 4,448,903 and 4,477,602.

Both ethylene glycol and 1,4-butane diol are also essential for the present invention.

Other additives which may be used in the process according to the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the isocyanate reactive component.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known release agents, cell regulators, flame retarding agents, plasticizers, dyes, fillers and reinforcing agents such as glass in the form of fibers or flakes or carbon fibers.

Water is used as the sole blowing agent. In general, the amount of water used can vary over wide limits. Typically, the amount of water used ranges from 0.1 to 1.0 parts per 100 parts of isocyanate reactive component.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the isocyanate component, while the second stream contains the isocyanate reactive components and any other additive which is to be included.

The invention is further illustrated but is not intended to be limited by the following examples in which all parts and percentages are by weight unless otherwise specified.

EXAMPLES

In the examples, the following materials were used:

POLYOL A: a polyether diol, having an OH number of about 28, prepared from propylene glycol, propylene oxide, and ethylene oxide, the weight ratio of propylene oxide to ethylene oxide being 70:30, with about 100% of the OH groups being primary;

POLYOL B: a dispersion having an OH number of about 28 and consisting of a polyhydrazodicarbonamide in a glycerin initiated propylene oxide/ethylene oxide polyether (having an OH number of about 35, with propylene oxide to ethylene oxide weight ratio of about 5:1) and produced by reacting toluene diisocyanate and hydrazine in the presence of the glycerin initiated polyether as described in U.S. Pat. No. 4,042,537; the dispersion has a solids content of 20% by weight;

POLYOL C: a polyether triol, having an OH number of about 28, prepared from glycerin, propylene oxide, and ethylene oxide, the weight ratio of propylene oxide to ethylene oxide being 5:1, with about 88% of the OH groups being primary;

XB: 1,4-butane diol;

EG: ethylene glycol;

DABCO: triethylene diamine, available from Air Products;

T-12: dibutyltin dilaurate;

1028: Dabco 1028, a catalyst available from Air Products;

WATER

S-25: Dabco S-25, a 1:3 mixture of triethylene diamine in XB, available from Air Products;

TEA: triethanolamine;

ISO A: an isocyanate having an isocyanate group content of about 19% by weight prepared by reacting:
  (i) 56 parts by weight of the 4,4'-isomer of methylenebis(phenyl isocyanate),
  (ii) 6 parts by weight of a carbodiimide modified methylenebis(phenyl isocyanate) having an isocyanate group content of 29.3% and a viscosity at 25° C. of less than 100 mPa.s, and
  (iii) 38 parts by weight of a 2000 molecular weight polyester diol prepared by reacting adipic acid, 1,4-butane diol and ethylene glycol (ethylene glycol to butane diol molar ratio of about 1:1);

ISO B: a 3:1 mixture of ISO A and a modified isocyanate having an isocyanate content of about 23% by weight, prepared by reacting 4,4'-methylenebis(phenyl isocyanate) and tripropylene glycol.

The examples were carried out using a DESMA PSA 90/91 machine under the following conditions:
  (a) temperature of the isocyanate component was about 35° C. and the temperature of the B-side was about 27° C.;
  (b) the mold temperature was about 43° C.;
  (c) the throughput was 55 gm/sec; and
  (d) the isocyanate index was 98.

The components noted in Table 1 were mixed in the amounts noted in Table 1. The liquid reaction mixture was quickly poured into a 0.625 cm×15 cm×15 cm plaque mold and demolded after about three minutes. All parts were molded at a density of about 0.46 gm/cc. Rossflex was measured according to ASTM D-1052. The parts were also tested for Shore A hardness (ASTM D-2240), tensile strength and elongation at break (ASTM D-412), split tear (ASTM D-3574, test F), Die C tear (ASTM D-624), Taber abrasion (ASTM D-1149) and volume swell under the influence of ASTM #3 oil and Fuel B (ASTM D-471). The results were as set forth in Table 2.

TABLE 1

| Example | 1 | 2 | 3 | 4 |
|---|---|---|---|---|
| B-side | | | | |
| POLYOL A | 76.00 | 76.00 | 72.85 | 72.85 |
| POLYOL B | — | — | 14.50 | 14.50 |
| POLYOL C | 9.87 | 9.87 | — | — |
| XB | 10.86 | 10.86 | 10.13 | 10.13 |
| EG | 0.99 | 0.99 | 0.97 | 0.97 |
| DABCO | — | — | 0.32 | 0.32 |
| T-12 | 0.02 | 0.02 | 0.03 | 0.03 |
| 1028 | — | — | 0.75 | 0.75 |
| WATER | 0.45 | 0.45 | 0.45 | 0.45 |
| S-25 | 1.58 | 1.58 | — | — |
| TEA | 0.20 | 0.20 | — | — |
| Isocyanate | ISO A | ISO B | ISO B | ISO A |
| Weight ratio of B-side to isocyanate | 100:86 | 100:81.6 | 100:74.4 | 100:78.3 |

TABLE 2

| Example | 1 | 2 | 3 | 4 |
|---|---|---|---|---|
| Shore A | 54 | 58 | 49 | 51 |
| Tensile, N/mm2 | 3.84 | 3.86 | 3.68 | 3.89 |
| Elongation, % | 423 | 374 | 374 | 410 |
| Split tear, pli | 17 | 17 | 15 | 18 |
| Taber abrasion, mg loss/1000 cycles | 52 | 74 | 40 | 40 |
| Die C tear, pli | 107 | 95 | 86 | 98 |
| Rossflex, cycles time 1000 to failure | | | | |
| −29° C. | 140 | 29 | 38 | 140 |
| −18° C. | >200 | >100 | >100 | >200 |
| room temp (ASTM #3 oil and Fuel B) | >100 | >100 | >100 | >100 |
| Volume swell, % in ASTM #3 and Fuel B, | 2.5 | 2.5 | 7.5 | 2.5 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of an integral skin foam by reacting an organic isocyanate with an active hydrogen group containing material in the presence of a catalyst and a blowing agent in a closed mold, the improvement wherein:

A) the organic isocyanate is an isocyanate having an isocyanate group content of from about 16 to about 25% by weight and consists of
  i) from 10 to 100 parts by weight of an isocyanate having an isocyanate group content of from about 16 to about 22% by weight and being prepared by reacting:
    1) from about 40 to about 60 parts by weight of methylenebis(phenyl isocyanate),
    2) from 0 to 10 parts by weight of a carbodiimide group modified methylenebis(phenyl isocyanate) having an isocyanate group content of from about 24 to about 33% by weight, and
    3) from about 30 to about 50 parts by weight of a polyester diol having a molecular weight of from about 1000 to about 3000, with the amounts of 1), 2), and 3) totaling 100 parts by weight; and
  ii) from 0 to 90 parts by weight of a modified isocyanate having an isocyanate group content of from about 18 to about 25% by weight and being prepared by reacting 1 mole of methylenebis(phenyl isocyanate) with from about 0.1 to 0.3 moles of a 134 to 700 molecular weight poly-1,2-propylene ether glycol;

B) the active hydrogen group containing material consists essentially of:
1) from about 10 to about 90 parts by weight of a polyether diol having an OH number of from about 20 to about 40, having an ethylene oxide content of from about 20 to about 40% by weight, and with from about 90 to about 100% of its hydroxyl groups being primary OH groups,
2) from about 10 to about 90 parts by weight of a polyether polyol having an OH number of from about 20 to about 40, and an average OH functionality of from 2.5 to 3;
3) from about 5 to about 15 parts by weight of 1,4-butane diol; and
4) from about 0.5 to about 10 parts by weight of ethylene glycol, with the amounts of 1), 2), 3), and 4) totaling 100 parts by weight; and C) the blowing agent consists solely of water.

2. The process of claim 1 wherein said isocyanate component A) i) is an isocyanate having an isocyanate group content of from about 18 to about 20% by weight.

3. The process of claim 2 wherein said isocyanate component A) i) is prepared by reacting:

(i) from about 50 to about 60 parts by weight of methylenebis(phenyl isocyanate),
(ii) from about 4 to about 8 parts by weight of a carbodiimide group modified methylenebis(phenyl isocyanate) having an isocyanate group content of from about 28 to about 31% by weight, and
(iii) from about 35 to about 41 parts by weight of a polyester diol having a molecular weight of from about 1500 to about 2500, with the amounts of (i), (ii) and (iii) totalling 100 parts by weight.

4. The process of claim 3 wherein said isocyanate A) i) is an isocyanate having an isocyanate group content of about 19% by weight prepared by reacting:

(i) 56 parts by weight of the 4,4'-isomer of methylenebis(phenyl isocyanate),
(ii) 6 parts by weight of a carbodiimide modified methylenebis(phenyl isocyanate) having an isocyanate group content of 29.3% and a viscosity at 25° C. of less than 100 mPa.s, and
(iii) 38 parts by weight of a 2000 molecular weight polyester diol prepared by reacting adipic acid, 1,4-butane diol and ethylene glycol (ethylene glycol to butane diol molar ratio of about 1:1).

5. The process of claim 1, wherein said isocyanate A) ii) has an isocyanate content of about 23% by weight and is prepared by reacting 4,4'-methylenebis(phenyl isocyanate) and tripropylene glycol.

6. The process of claim 1 wherein water is used in an amount of 0.1 to 1.0 parts per 100 parts of isocyanate reactive component.

* * * * *